UNITED STATES PATENT OFFICE.

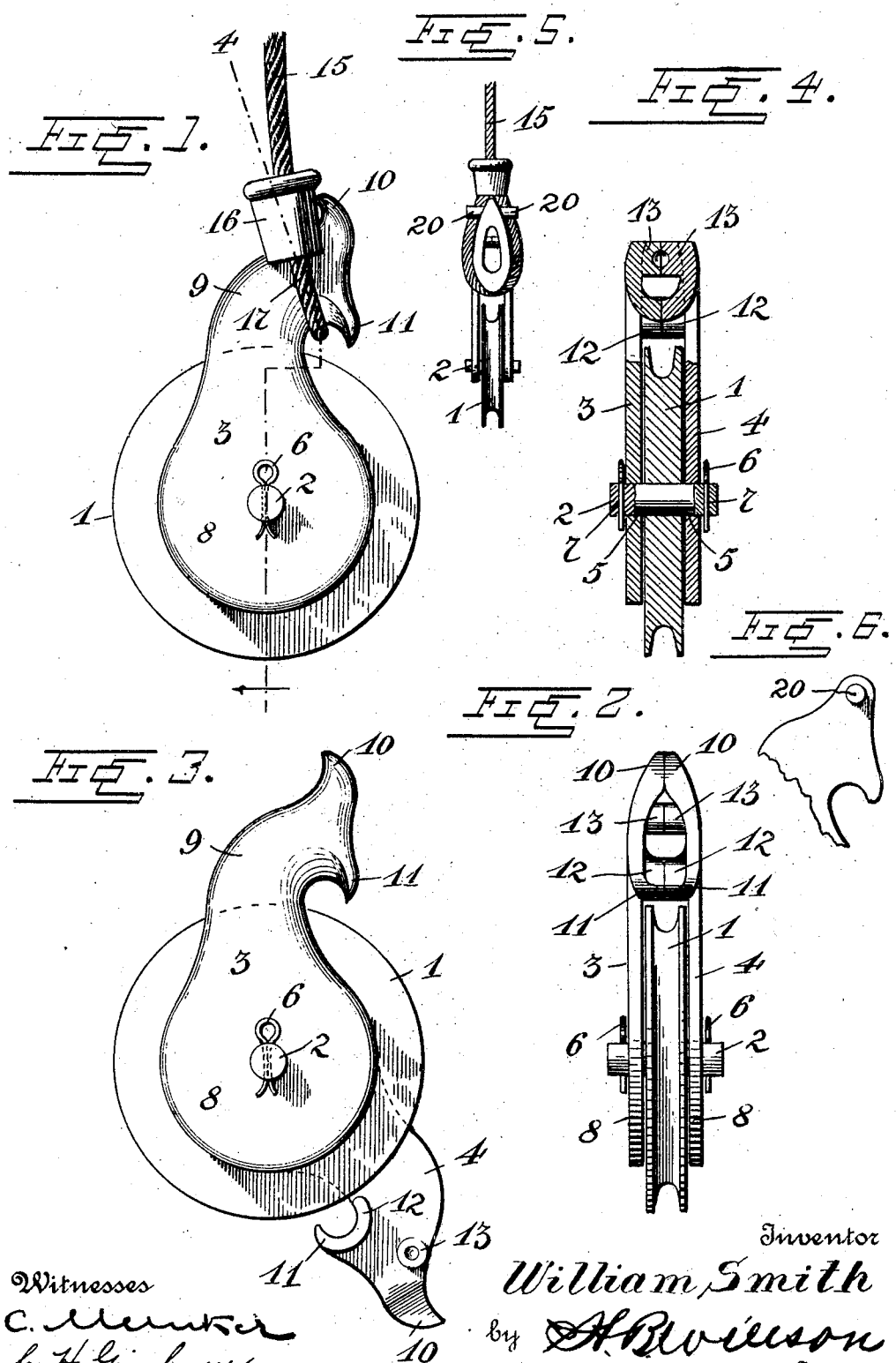

WILLIAM SMITH, OF LA CRESCENT, MINNESOTA.

SNATCH-BLOCK.

No. 796,365.   Specification of Letters Patent.   Patented Aug. 1, 1905.

Application filed December 29, 1904. Serial No. 238,826.

*To all whom it may concern:*

Be it known that I, WILLIAM SMITH, a citizen of the United States, residing at La Crescent, in the county of Houston and State of Minnesota, have invented certain new and useful Improvements in Snatch-Blocks; and I do declare the following to be a full, clear, and exact description of the invention, such as will enable others skilled in the art to which it appertains to make and use the same.

My invention relates to improvements in snatch-blocks.

The object of my invention is to improve the construction of the casing or shell of the block, to produce one composed of as few parts as possible in order to furnish a snatch-block sufficiently strong for the heaviest pulling without being too weighty for convenient handling, and to reduce the cost of manufacture, so that it may be brought into use wherever required.

A further object of the invention is to provide a snatch-block which may be readily opened and closed to permit a rope to be easily applied to or removed from the sheave and one which cannot possibly open while in use.

In carrying out my invention I employ two separate casing members, one upon each side of the sheave, and hang them on the pin or journal of the sheave, the outward extremity of each casing member being bent inwardly at its extreme outer end to bear against the same end of the other member and each of said outer ends being provided with a hook or hooks, as shown.

In the accompanying drawings, Figure 1 is an elevation of a snatch-block constructed in accordance with my invention, the same being shown in its closed position. Fig. 2 is an edge view of the block, omitting the rope and loop. Fig. 3 is a view of the snatch-block in its opened position. Fig. 4 is a sectional view taken on the plane indicated by the line 4 4 of Fig. 1, omitting the rope and loop. Fig. 5 is an edge view similar to Fig. 2, showing a slightly-modified form of the snatch-block; and Fig. 6 is a detail view of the hook of one of the casing members, showing the right-angularly-projecting stud formed thereon.

Referring to the drawings by numeral, 1 denotes a pulley or sheave of any well-known or preferred construction mounted to rotate upon a shaft preferably in the form of a steel pin 2. Said pin may be secured in any desired manner between the two half-sections 3 and 4 of the block. As shown, it projects through suitable openings 5, formed in said half-sections, and is retained therein by split keys 6, which are passed through transverse openings 7, formed adjacent to the ends of said pin. The said half-sections, which are thus pivotally mounted upon the pin 2, are similar in construction and are preferably of metal, as shown. Each comprises a circular body 8, in which one of the openings 5 is formed, and a curved projecting portion 9, having oppositely-projecting hooks 10 and 11 at its outer end, as shown. Said hooks are so shaped and disposed that when the sections 3 and 4 are swung into register or alinement with each other, as seen in Fig. 1 of the drawings, the hooks 10 of the two sections will form a single hook and the two hooks 11 will form another one. The portions 9 of the sections are preferably hollowed or recessed upon their inner sides, as shown, and are spaced apart by ribs or flanges 12 and studs or bosses 13. The half-sections are adapted to be held together in their closed position by the attaching link or loop of the block, which link or loop is engaged with the hooks 10 and 11. My improved loop and loop-coupler, which is described and claimed in my application for patent, filed December 29, 1904, and bearing Serial No. 238,528, is well adapted for the above purpose, and in Figs. 1 and 2 of the drawings I have shown the same applied. As shown, the device comprises a rope, cable, or other flexible element 15, passing freely through an opening in a coupling-block 16 and having one of its ends 17 secured in said coupling-block. In applying the device to the snatch-block the loop is passed around the neck formed by the contracted portion of the arm 9 and engaged with the hooks 10 and 11, and the free end of the cable is drawn upon to cause the said loop to tighten around the neck, as clearly shown in the drawings.

In Figs. 5 and 6 of the drawings I have shown a slightly-modified form of hook for the casing members. In this form instead of making the hooks or portions 10 extend parallel or in the direction of the length of the casing members, as seen in Figs. 1 and 3, I provide said portions with studs or lugs 20, which extend outwardly at right angles, as shown. These studs or lugs 20 serve the same purpose as the hooks 10—namely, to keep the cable or the coupling-block in engagement with the casing members.

The construction, operation, and advantages of my invention will be readily understood from the foregoing description, taken in connection with the accompanying drawings. It will be seen that a rope or cable may be quickly and easily applied to or removed from the block by simply loosening the attaching loop or link and swinging the half-sections 3 and 4 to their opened position. (Shown in Fig. 3 of the drawings.) It will be further noted that the snatch-block is of exceedingly simple, durable, and inexpensive construction and that owing to the peculiar shape and disposition of the hooks 10 and 11 it will be impossible for the attaching link or loop to slip off when the device is in use.

While I have shown and described the preferred embodiment of my invention, it will of course be understood that various changes in the form, proportion, and the minor details of construction may be resorted to without departing from the principle or sacrificing any of the advantages of this invention.

Having thus described my invention, what I claim as new, and desire to secure by Letters Patent, is—

1. A snatch-block comprising, in combination with a sheave and an axle therefor, a pair of casing members pivoted on the axle on opposite sides of the sheave, and each having a bent arm at one end provided with oppositely-extending projections to retain a loop on the neck formed by the said arms.

2. A snatch-block comprising, in combination with a sheave and an axle therefor, a pair of casing members pivoted on the sheave-axle, on opposite sides of the sheave, and each provided with a bent arm having oppositely-projecting hooks at its outer end, for the purpose set forth.

3. A snatch-block comprising, in combination with a sheave and an axle therefor, a pair of casing members pivoted on the axle on opposite sides of the sheave, each of said casing members having a bent arm at one end and widened at its other end, the said bent arms being provided on their opposing inner sides with coacting spacing members adapted to come in contact when the said casing members are in alining position.

In testimony whereof I have hereunto set my hand in presence of two subscribing witnesses.

WILLIAM SMITH.

Witnesses:
FRANK R. SMITH,
MARK W. SMITH.